Patented Dec. 26, 1933

1,941,414

UNITED STATES PATENT OFFICE 1,941,414

METHOD OF IMPROVING CREAM

Milton E. Parker, Norfolk, Va., assignor to Research Laboratories of National Dairy Products Corporation, Inc., Baltimore, Md., a corporation of Maryland No Drawing. Application January 24, 1930
Serial No. 423,255

22 Claims. (Cl. 99—11)

This invention relates to improvements in methods of treating cream of varying qualities, due to acid and allied fermentations and has for its principal object the improvement of a sour cream to obtain a product having a high percentage of butter fat and substantially free from all traces of acidity.

The generally accepted practice of creameries has been to treat the so-called sour cream with an alkali which serves either as a neutralizing agent or to render the cream distinctly alkaline, the purpose of such treatment being to soften and dissolve the curd. Thereafter the cream is usually separated from the alkali agent by centrifugal processes.

With the present invention, instead of using an alkali in accordance with conventional processes, I propose to accomplish softening and dissolution of the curd by means of its digestion with a digestive ferment or enzymic agent.

It has been found that to effectively carry out the digestive step, in most cases, it is essential that the hydrogen ion concentration of the cream be adjusted to a point at which the particular ferment or digestive agent employed will exert its maximum digestive power.

This adjustment of the hydrogen ion concentration of the sour cream may be accomplished by adding in relatively small amounts either an alkali or an acid and will depend upon the acidity and general characteristics of the cream, as well as the particular enzyme or ferment to be employed.

Where the original acidity of the cream is at the optimum point for digestive action by a particular enzyme, it will be understood that the hydrogen ion concentration adjustment will ordinarily not be required, and the invention proceeds without disturbing the acidity, the softening and dissolution of the curd being accomplished by the added digestive agent.

On the other hand, where hydrogen ion concentration adjustment is desirable, the acidity is modified for the singular purpose of facilitating the maximum action by the digestive agent, as distinguished from the usual methods employing alkali to neutralize or impart a distinct alkalinity to the cream, it being understood that in accordance with the present invention, the softening and dissolving of the curd is effected by digestion.

I have found that the digestive action is enhanced if the original soured cream be diluted with water. The dilution enables more complete digestive action and where hydrogen ion concentration adjustment is required, such adjustment is facilitated.

It is furthermore an object of my invention to separate the improved cream from the mass after sufficient digestive action of the curd, preferably by centrifugal processes, although other separating means may be employed, and I have found that by heating the treated cream just prior to its separation in the centrifuge that a very complete removal of the digested curd and other deleterious and undesirable products is obtained as well as the separation of a cream having a very high butter fat content. By this final heating step moreover, any remaining active digestive agent will be rendered innocuous, should it be carried over in the separated cream.

With the present process, I am enabled to obtain a sweet pure cream which will remain wholesome for a reasonable period, and wherein the cream is more uniform than the products at present obtained with conventional methods.

The sour cream, as received at the creameries ordinarily has a hydrogen ion concentration ranging from pH 3.0 to pH 5.0. Such cream is usually collected from various producers and placed in a common receptacle.

With the present invention, the cream is preferably diluted with ordinary tap water, the dilution preferably being in such ratio as to render the diluted cream of approximately 20% butter fat by weight. It will be understood that such dilution will, at times, not be essential to the carrying out of this process, in view of the nature of the cream, and it may be effected to a greater or less degree, determined upon the standards employed and the analyses of the cream.

The dilution step above referred to has a twofold advantage in that the diluting medium will in effect accomplish a washing of the cream and enable more complete enzymic digestion while at the same time such dilution will facilitate the hydrogen ion concentration adjustment. In other words, the water acts to increase the dispersion of the precipitated curd and solid particles so that they are rendered more available for action by the enzyme and moreover decreases the buffer action of the sour cream and enables hydrogen ion concentration adjustment to be accomplished more rapidly and economically.

In referring in this specification to cream, it will now be understood that this may include cream which it has not been found necessary to dilute or cream which, for effective operation, has been diluted, as described.

Moreover, the step of dilution, as well as the steps of hydrogen ion concentration adjustment, heating and addition of the digestive agent to be hereafter more completely set forth, may be carried out in any sequence which is found most expedient. In the following description, the preferred method will be outlined by way of example.

The cream or diluted cream is preferably warmed to a temperature which will enable optimum enzymic digestion. This temperature will vary with the nature of the cream, and the particular digestive ferment or enzymic agent employed.

I propose to employ such digestive agents as pepsin, papain, bromelin, trypsin and protease.

I have found that the temperature for optimum action of the various enzymes will vary generally from 120° to 180° F.

Where the hydrogen ion concentration of the original cream or the hydrogen ion concentration of the cream after dilution is satisfactory, it will not be necessary to effect further hydrogen ion concentration adjustment, and the cream will be subjected to digestive action without further treatment, except the heating or warming step above referred to. This initial warming or heating is resorted to for the purpose of accelerating the digestive action. It will be understood, however, that the cream may be treated in the cool state or may be warmed or heated to any degree below or beyond the range given above, but the temperature range specified has been found to give the most rapid and complete digestive action.

The enzyme is added to the warmed cream having the appropriate hydrogen ion concentration for its active, rapid and complete digestion, and is preferably introduced with a suitable activator or co-enzyme, although the latter is not always necessary, as will be later set forth.

Anyone of a number of such activators may be employed and I have found for example that hydrochloric acid, acetic acid as well as sodium nitrate, sodium chloride, sodium sulphate, sodium citrate, and sodium phosphate are all suitable.

These co-enzymes or activators may be employed as the vehicle for the enzyme in that the enzyme may be carried in solution or the enzyme and co-enzyme may be introduced in the cream separately.

The concentration of the co-enzyme is ordinarily not sufficient to appreciably effect the hydrogen ion concentration of the cream. However, I have found where hydrogen ion concentration adjustment is necessary that it can be accomplished by increasing the concentration of the co-enzyme, more particularly in the case where a distinctly acid co-enzyme such as hydrochloric acid is utilized.

It will thus be seen that the co-enzyme may accomplish the two-fold purpose in some cases of an activator as well as a means of adjusting the hydrogen ion concentration of the cream.

At this point it should be stated that with the present invention the acidity of the sour cream is not disturbed except in so far as it is necessary to adjust or modify the hydrogen ion concentration of the cream or the diluted cream to the optimum point of digestive action with a particular enzyme, as distinguished from known processes which utilize the alkalies to soften and dissolve the curd.

The sequence of operation is preferably dilution where necessary, warming and addition of the digestive agent and activator where the latter is employed.

The process as thus far explained has proceeded on the assumption that the hydrogen ion concentration of the original cream or diluted cream was satisfactory, or could be adjusted by means of the particular activator or co-enzyme utilized.

Where adjustment of the hydrogen ion concentration of the cream or diluted cream is necessary, I add either an alkali or an acid.

Of the acids which I have found satisfactory for this purpose, there may be mentioned hydrochloric acid, sulphuric acid, nitric acid, phosphoric acid and acetic acid.

The alkalies which have been successfully used are sodium carbonate, trisodium phosphate, caustic soda, calcium carbonate and magnesium carbonate.

As an instance of the operation of the invention, where hydrogen ion concentration adjustment is necessary, I will exemplify the use of pepsin as the digestive agent.

The cream or diluted cream is treated if necessary to adjust its hydrogen ion concentration approximately to pH 2.0 to pH 3.0. This may be accomplished by adding a suitable acid, preferably hydrochloric acid, and the hydrogen ion concentration adjustment may be effected either before or after the introduction of the enzyme and co-enzyme when the latter is employed. Preferably, however, the acid is first diluted with water to prevent any possibility of local precipitation of the curd which might act to decelerate the digestive action.

The diluted adjusted cream is warmed to substantially 140° F. which at the pH mentioned is the optimum temperature for enzymic digestion by pepsin, and the pepsin is then added in the ratio of one pound of 13,000 U. S. P. standard product to each 400 gallons of diluted cream. Whenever the cream has varying qualities and characteristics due to acid and allied fermentations, this ratio may be varied or departed from in accordance with the condition of the curd.

The pepsin is preferably prepared by dissolving it in diluted hydrochloric acid, such solution serving as an effective vehicle for the proper distribution of the enzymic agent throughout the treated cream as well as acting as an enzymic activator.

The hydrogen ion concentration adjustment may take place prior to or after the enzyme has been introduced to the warmed cream. Likewise, the warming may be accomplished at any desired point, either before or after the hydrogen ion concentration adjustment or the introduction of the enzyme and activator, it being clear that the dilution and hydrogen ion concentration adjustment as well as the temperature are controlled for the purpose of allowing optimum digestive action.

At this point it should be understood that after the enzyme has been added should the hydrogen ion concentration value show a divergence from the optimum required for rapid and complete digestive action, additional acid as required may be added to establish the proper hydrogen ion concentration value.

It will be understood that the cream need not be heated, but I have found that where its temperature is raised, the digestive action will be accomplished more completely and rapidly.

It will be understood that hydrochloric acid is an effective enzymic activator.

Moreover, the pepsin may be added independently of the activator, or the acid may be added entirely at one step in lieu of the step of adding the pepsin solution, and then the additional acid, to adjust the hydrogen ion concentration.

Where an enzyme such as trypsin is employed and the hydrogen ion concentration adjustment is required, I proceed as heretofore by adjusting the hydrogen ion concentration with an alkali, for example, caustic soda, to a value of pH 5.0 to pH 7.0.

I have found that tryptic digestion proceeds without addition of an activator when the proper hydrogen ion concentration is established.

The cream or diluted cream having its hydrogen ion concentration value adjusted to the point indicated is then warmed to substantially 110° F. to 120° F., which at the hydrogen ion concentration preferred to is the optimum temperature for enzymic digestion by trypsin.

It will, therefore, be seen that where hydrogen ion concentration adjustment is required and pepsin is utilized that the acidity is increased by the addition of an acid, whereas when hydrogen ion concentration adjustment is required and trypsin is employed, the hydrogen ion concentration is decreased by the addition of an alkali.

An activator will preferably be employed whenever the effective digestion of the cream so requires, but, as stated, in the case of trypsin no activator or co-enzyme is necessary.

Where no hydrogen ion concentration adjustment is required, obviously any one of the above mentioned digestive agents with or without a suitable activator may be utilized.

The matter of suitable dilution has already been explained and its advantages and desirability will be determined by circumstances surrounding the operation.

At this point, it will be understood that the mass comprises the cream diluted if necessary, with its hydrogen ion concentration adjusted if found essential and the temperature modified for the purpose of effecting maximum digestive action of a particular enzyme employed.

The mass of cream, digestive ferment and activator, where employed, is then thoroughly mixed, preferably without foaming, after which it is allowed to stand undisturbed in an insulated receptacle for the period of digestive action. While, as understood, this period may vary depending upon the hydrogen ion concentration of the cream, and the digestive agents employed as well as the temperature of the mass, I have found that ordinarily the digestion will be satisfactory within twenty minutes, although two hours gives a more complete action.

The digestive action results in dissolving and softening the curd and, after sufficient digestion, as above described, the mixture is passed through a centrifugal separator, where the cream is removed from the other liquids formed by the reaction of the enzyme and the curd. A small percentage of solids is also removed by the separator, representing foreign material and some of the undigested curd. The presence of undigested curd will, of course, be controlled by the extent to which the enzymic digestive action is allowed to proceed.

At this point, it will be understood that any conventional centrifugal apparatus may be employed or other suitable separating means, as is well known in practice.

The treated cream recovered by the separating action, above referred to, has been found to retain its fat in normal globular form, and thus may be used for any purpose to which fresh or sweet cream is employed. It is preferable, however, that the separated cream be first reconstituted or standardized, as will be understood in the art, to a normal butter fat content by the addition of fresh wholesome skimmed milk or other low fat content milk products.

I have found that the treated cream, as it leaves the separator, may contain as high as 90% butter fat by weight.

The cream just prior to its introduction into the centrifuge or its separation therein will be heated to approximately 160° F. to 180° F. The purpose of such final heating is to render innocuous any traces of active enzyme such as might otherwise be carried over in the separated cream. Moreover, this heat treatment is essential to obtaining a separated cream of high butter fat content, for example 90% or greater and also results in a reduced fat loss which has been found to be generally below .6%.

This final heat treatment in effect provides an adequate pasteurization, thereby eliminating the necessity for any further similar operation.

It will be understood that a high butter fat content in the separated treated cream is a complete indication that the separation has resulted in the removal of from 70 to 85% of the digested curd and other undesirable products present in the original cream. The efficiency of the removal of the curd and foreign matter depends, of course, upon the butter fat content of the original cream, and also upon the extent of digestive action.

It will be understood from the above process, that it is a complete departure from present conventional methods, wherein neutralizing agents to act as a diluent and to dissolve the curd are employed. With the present process, the acidity is undisturbed, except for the purpose of hydrogen ion concentration adjustment where necessary, as above described, and the curd is softened and dissolved by means of enzymic digestion.

As a result, a sweet cream which will remain wholesome for a reasonable period is obtained, and for the purpose of butter making a very uniform product is consistently secured.

By reason of the process employed, the treated cream may be employed in butter making, since it will be possible to utilize butter milk from churned wholesome cream as a standardizing medium for the treated cream. Such butter milk has proven superior to fresh sweet skimmed milk for standardizing purposes for butter making, both from the standpoint of superior organoleptic and physical characteristics imparted to the butter resulting from the churned treated cream which has been standardized with butter milk.

The separated cream obtained by practicing the process of this invention may be reconstituted if found necessary or desirable, by the addition of one or more of series of milk products including buttermilk, skimmilk, whole milk and ice cream mix. This latter is a mixture of milk, cream, sugar and gelatin in viscous form.

In reconstituting, temperature is a vital factor and the diluting milk product should be of approximately the same temperature as the hot separated product of the treated cream if a desirable reconstituted product, both from organoleptic and physical considerations, is to be obtained. Agitation sufficient to thoroughly mix the separated cream and its diluting medium is also usually necessary.

It will be understood that various forms of digestive ferments or enzymic agents may be employed in addition to those mentioned, and that any number of different activators will likewise be found satisfactory.

The temperature ranges as given herein for the initial warming of the cream and its final heating prior to centrifugation or separation are approximate, and are subject to variation depending upon circumstances.

In the claims, the reference to enzymic agent is construed to cover any form of digestive ferment or enzyme, and the term activator is construed to cover any form of co-enzyme.

Furthermore, reference in the claims to adjusting the hydrogen ion concentration will be construed to cover adjustment with an acid or alkali to increase or decrease the acidity for the purposes set forth in the specification.

What I claim is:

1. The process of treating sour cream which comprises adding an enzyme, and softening and dissolving the curd by enzymic digestion without disturbing the acidity while maintaining the mixture at substantially optimum conditions for enzymic digestion, and separating out the cream.

2. The process of treating sour cream which comprises adding an enzyme and an activator, softening and dissolving the curd by enzymic digestion without disturbing the acidity while maintaining the mixture at substantially optimum conditions for enzymic digestion, and separating out the cream.

3. The process of treating sour cream having varying qualities due to acid and allied fermentations which comprises subjecting the cream to an enzyme while maintaining the temperature of the cream at the optimum for enzymic digestive action, and separating out the cream.

4. The process of treating sour cream having varying qualities due to acid and allied fermentations which comprises diluting the cream to reduce the proportion of butter fat, subjecting the diluted cream to the action of an enzyme while maintaining the mixture at substantially optimum conditions for enzymic digestion, and separating out the cream.

5. The process of treating sour cream having varying qualities due to acid and allied fermentations which comprises diluting the cream to reduce the proportion of butter fat, subjecting the diluted cream to the action of an enzyme while maintaining the cream in warmed condition, and separating out the cream.

6. The process of treating sour cream having varying qualities due to acid and allied fermentations which comprises subjecting the cream to the action of an enzyme while maintaining the mixture at substantially optimum conditions for enzymic digestion, thereafter heating the cream to render innocuous any of the remaining active enzyme, and separating out the cream.

7. The process of treating sour cream having varying qualities due to acid and allied fermentations which comprises subjecting the cream in warm condition to the action of an enzyme, thereafter heating the cream to render any remaining active enzyme innocuous, and separating out the cream.

8. The process of treating sour cream having varying qualities due to acid and allied fermentations which comprises diluting the cream to reduce the proportion of butter fat, subjecting the cream to the action of an enzyme while maintaining the mixture at substantially optimum conditions for enzymic digestion, thereafter heating the cream to render innocuous any of the remaining active enzyme, and separating out the cream.

9. The process of treating sour cream having varying qualities due to acid and allied fermentations which comprises diluting the cream to reduce the proportion of butter fat, subjecting the cream in warm condition to the action of an enzyme, thereafter heating the cream to render any remaining active enzyme innocuous, and separating out the cream.

10. In the process of treating sour cream with an enzyme, the step of adjusting the hydrogen ion concentration of the cream to the point at which the optimum digestive power of the enzyme will be exerted, digesting with an enzyme and separating out the cream.

11. In the process of treating sour cream with an enzyme, the step of diluting and adjusting the hydrogen ion concentration of the cream to the point at which the optimum digestive power of the enzyme will be exerted, digesting with an enzyme and separating out the cream.

12. In the process of treating sour cream with an enzyme, the step of adjusting the hydrogen ion concentration of the cream and bringing the temperature thereof to the point at which the optimum digestive power of the enzyme will be exerted, digesting with an enzyme and separating out the cream.

13. In the process of treating sour cream with an enzyme, diluting the cream, adjusting the hydrogen ion concentration of the cream and bringing the temperature thereof to the point at which the optimum digestive power of the enzyme will be exerted, digesting with an enzyme and separating out the cream.

14. In the process of treating sour cream with an enzyme, the step of adjusting the hydrogen ion concentration of the cream to the point at which the optimum digestive power of the enzyme will be exerted, digesting with an enzyme subjecting the digested cream to a temperature sufficient to render innocuous any remaining active enzyme, and separating out the cream.

15. In the process of treating sour cream with an enzyme, the step of diluting and adjusting the hydrogen ion concentration of the cream to the point at which the optimum digestive power of the enzyme will be exerted, digesting with an enzyme subjecting the digested cream to a temperature sufficient to render innocuous any remaining active enzyme, and separating out the cream.

16. In the process of treating sour cream with an enzyme, the step of adjusting the hydrogen ion concentration of the cream and bringing the temperature thereof to the point at which the optimum digestive power of the enezyme will be exerted, digesting with an enzyme subjecting the digested cream to a temperature sufficient to render innocuous any remaining active enzyme, and separating out the cream.

17. In the process of treating sour cream with an enzyme, diluting the cream, adjusting the hydrogen ion concentration of the cream and bringing the temperature thereof to the point at which the optimum digestive power of the enzyme will be exerted, digesting with an enzyme subjecting the digested cream to a temperature sufficient to render innocuous any remaining active enzyme, and separating out the cream.

18. The process of treating sour cream which comprises diluting the cream with water to reduce the proportion of butter fat and facilitate hydrogen ion concentration adjustment, adjusting the hydrogen ion concentration of the diluted cream and modifying the temperature thereof to the point at which the optimum digestive power of an enzyme employed will be exerted, adding an enzyme to soften and dissolve the curd, allowing digestion to take place, thereafter heating the digested cream to a temperature to render innocuous any remaining active enzyme, and separating out the cream.

19. The process of treating sour cream which comprises diluting the cream with water to reduce the proportion of butter fat and facilitate hydrogen ion concentration adjustment, adjusting the hydrogen ion concentration of the diluted cream and modifying the temperature thereof to the point at which the optimum digestive power of an enzyme employed will be exerted, adding an enzyme and an activator to soften and dissolve the curd, allowing digestion to take place, thereafter heating the digested cream to a temperature to render innocuous any remaining active enzyme, and separating out the cream.

20. The process of treating sour cream having varying qualities due to acid and allied fermentations which comprises subjecting the cream to an enzyme while maintaining the condition of the cream substantially at the optimum for enzymic digestive action, and separating out the cream.

21. The process of treating sour cream which comprises treating the cream with an enzyme and softening and dissolving the curd, separating out the cream, adding to the cream one of a series of milk products selected from a group consisting of buttermilk, skimmilk, whole milk and ice cream mix having a temperature substantially equal to that of the cream, and agitating the cream diluted with such milk product.

22. The process of treating sour cream to improve the same and render it useful for the making of butter which comprises treating the cream with an enzyme and softening and dissolving the curd, separating out the cream and adding thereto buttermilk at a temperature substantially equal to that of the cream, and agitating the mixture.

MILTON E. PARKER.